United States Patent
Thompson

(10) Patent No.: US 10,254,008 B2
(45) Date of Patent: Apr. 9, 2019

(54) THERMOS AT ALGORITHM FOR FULLY MODULATING FURNACES

(75) Inventor: Kevin D. Thompson, Indianapolis, IN (US)

(73) Assignee: CARRIER CORPORATION, Farmington, CT (US)

( * ) Notice: Subject to any disclaimer, the term of this patent is extended or adjusted under 35 U.S.C. 154(b) by 1594 days.

(21) Appl. No.: 13/114,205

(22) Filed: May 24, 2011

(65) Prior Publication Data

US 2011/0309155 A1 Dec. 22, 2011

Related U.S. Application Data

(60) Provisional application No. 61/357,385, filed on Jun. 22, 2010.

(51) Int. Cl.
| | | |
|---|---|---|
| F24H 8/00 | (2006.01) |
| F23N 5/20 | (2006.01) |
| F24H 3/02 | (2006.01) |
| F24H 3/06 | (2006.01) |
| F24H 9/20 | (2006.01) |

(52) U.S. Cl.
CPC .............. *F24H 8/00* (2013.01); *F23N 5/203* (2013.01); *F24H 3/025* (2013.01); *F24H 3/065* (2013.01); *F24H 9/2085* (2013.01); *Y02B 30/102* (2013.01)

(58) Field of Classification Search
CPC ............. F23N 2027/00; F23N 2027/10; F23N 2027/02; F23N 2037/10; F23N 5/203; F23N 1/002; F24H 8/00; F24H 3/065; F24H 3/025; F24H 9/2085

USPC .............. 236/10, 11, 1 C, 1 E, 1 EB, 16 BD; 126/116 A

See application file for complete search history.

(56) References Cited

U.S. PATENT DOCUMENTS

| | | | |
|---|---|---|---|
| 4,638,942 A | | 1/1987 | Ballard et al. |
| 5,337,952 A | | 8/1994 | Thompson |
| 5,340,028 A | * | 8/1994 | Thompson ...................... 236/10 |
| 5,860,411 A | | 1/1999 | Thompson et al. |
| 6,244,515 B1 | * | 6/2001 | Rowlette et al. ............. 236/1 E |
| 6,257,870 B1 | * | 7/2001 | Hugghins et al. .............. 431/18 |
| 6,283,115 B1 | * | 9/2001 | Dempsey et al. ........ 126/110 R |
| 6,321,744 B1 | | 11/2001 | Dempsey et al. |
| 6,370,894 B1 | | 4/2002 | Thompson et al. |
| 6,464,000 B1 | | 10/2002 | Kloster |
| 6,705,533 B2 | | 3/2004 | Casey et al. |
| 6,719,207 B2 | | 4/2004 | Kloster |
| 6,866,202 B2 | | 3/2005 | Sigafus et al. |
| 6,925,999 B2 | | 8/2005 | Hugghins et al. |
| 7,293,718 B2 | | 11/2007 | Sigafus et al. |
| 7,455,238 B2 | | 11/2008 | Hugghins |

(Continued)

*Primary Examiner* — Larry Furdge
(74) *Attorney, Agent, or Firm* — Cantor Colburn LLP

(57) ABSTRACT

A method and system for operating a modulating furnace from a single-stage thermostat. The furnace control system may include a processor, a gas valve, a variable-speed motor, and a thermostat. The furnace control may execute a thermostat algorithm comprising the steps of: determining if a heating load needs to be satisfied; running burners at an intermediate input rate, a modulated input rate, and a maximum input rate for each respective first, second, and third time intervals until the heating load is satisfied; calculating a heating load requirement as function of the time intervals; and determining an initial input rate for a next cycle based on the calculated heating load requirement.

19 Claims, 3 Drawing Sheets

(56) References Cited

U.S. PATENT DOCUMENTS

| | | |
|---|---|---|
| 7,985,066 B2* | 7/2011 | Chian et al. .................... 431/19 |
| 8,123,518 B2* | 2/2012 | Nordberg et al. .............. 431/12 |
| 2002/0155405 A1 | 10/2002 | Casey et al. |
| 2005/0092317 A1* | 5/2005 | Hugghins et al. ........ 126/116 A |
| 2006/0199121 A1 | 9/2006 | Caskey |
| 2007/0063059 A1* | 3/2007 | Votaw et al. ................. 236/1 B |
| 2007/0095520 A1* | 5/2007 | Lorenz et al. ................ 165/267 |
| 2008/0124667 A1* | 5/2008 | Schultz ........................... 431/18 |
| 2009/0044794 A1 | 2/2009 | Hugghins et al. |
| 2011/0100349 A1* | 5/2011 | Hugghins ................ 126/116 A |
| 2011/0269082 A1* | 11/2011 | Schultz ........................... 431/12 |
| 2014/0023976 A1* | 1/2014 | Chian et al. ................... 431/12 |

* cited by examiner

THERMOSTAT ALGORITHM FOR FULLY MODULATING FURNACES

CROSS-REFERENCE TO RELATED APPLICATIONS

This is a non-provisional U.S. patent application, which claims priority under 35 U.S.C. § 119(e) to U.S. Provisional Patent Application Ser. No. 61/357,385 filed on Jun. 22, 2010, the entirety of which is incorporated by reference herein.

FIELD OF THE DISCLOSURE

The present disclosure generally relates to furnaces and, in particular, relates to a furnace control system and method for providing variable heating rates in a modulating furnace utilizing a single stage thermostat.

BACKGROUND OF THE DISCLOSURE

Gas furnaces are widely installed in homes for heating purposes. One common type of furnace is an induced-draft gas furnace. In an induced-draft gas furnace, a gas valve typically establishes the flow of gas into a combustion chamber while a motor-controlled blower induces air and combustion gases through the combustion chamber. In order to improve the operating efficiency of induced-draft gas furnaces, attempts have been made in developing variable draft-induced gas furnaces. Generally, the two types of variable draft-induced gas furnaces are known as multi-stage systems and modulating systems. When the user of a multi-stage system selects a thermostat setting, the system signals the gas valve to supply gas to the combustion chamber at a fixed rate corresponding to the selected thermostat setting. The system also signals the blower motor to induce a draft through the combustion chamber at a fixed rate corresponding to the gas flow rate.

Modulating systems typically utilize variable-speed blower motors and electronically modulating gas valves. Modulating systems vary the gas valve outlet pressure by varying an electronic signal to the gas valve. Thus, a modulating system can provide more precise control over gas flow than possible in a conventional multi-stage system. Attempts have been made in designing a modulating gas valve by the Carrier Corporation, the assignee of the present disclosure. Carrier Corporation disclosed in U.S. Pat. No. 5,860,411 a modulating gas valve that is responsive to pressure changes in order to regulate gas flow with the flow level of combustion air. In another U.S. Pat. No. 6,321,744, the Carrier Corporation disclosed a throttling valve responsive to differential pressure signals and furnace control signals, as well as inducer and blower motors responsive to speed control signals, in order to improve fuel utilization efficiency. Although modulating gas valves and variable-speed motors have been disclosed for modulating systems, a need for a thermostat algorithm for modulating systems still remains in order to gain greater control of the modulating system and optimize operational efficiency.

Another common feature used with gas furnaces is a two-stage thermostat to control the furnace. The two-stage thermostat allows dual rate heating, wherein the first stage of the thermostat operates the furnace on low heat and the second stage of the thermostat operates the furnace on high heat. A typical two-stage thermostat comprises two small mercury bulb contacts on a bi-metal sensor that close and open as a function of the movement of the bi-metal sensor in response to changing room temperatures. If the room temperature changes from a desired temperature set point, then the mercury bulb contacts close one at a time depending on how drastic of change in room temperature occurs. For example, the first mercury bulb will close with just a degree difference in temperature activating low heat, afterwards the second mercury bulb will close if the temperature difference increases another degree to activate high heat. Once the heating load is satisfied, both mercury bulb contacts will sequentially open or deactivate, thereby terminating the heating cycle. If a new heating load is requested, the furnace control repeats the same identical cycle. A disadvantage of furnace controls with two-stage thermostat is limited heating rates with large swings in room temperature. Single-stage thermostats are even more limiting since they only provide one heating rate creating even larger swings in room temperature.

Attempts have been made in designing thermostat algorithms that will provide multiple heating modes using a single-stage thermostat by the Carrier Corporation, the assignee of the present disclosure. Carrier disclosed in U.S. Pat. Nos. 5,340,028 and 5,337,952 methods for using a single-stage thermostat to control furnaces with multiple heating modes that adapt based on the previous cycle performance. However, a need for a thermostat algorithm for a modulating furnace still remains.

SUMMARY OF THE DISCLOSURE

In accordance with one aspect of the disclosure, a control system including a processor containing at least one algorithm capable of providing multiple heating modes for a modulating furnace, a gas valve capable of modulating gas flow based on control signals received from the processor, at least one variable-speed motor capable of adjusting speed based on control signals received from the processor, and a thermostat capable of providing a signal indicating a heating load request to the processor is disclosed.

In accordance with another aspect of the disclosure, a method for providing multiple heating modes for a modulating furnace is disclosed. The method may include determining an existence of a heating load to be satisfied; determining if a maximum input rate is required at start-up; if the maximum input rate is not required at start-up, running burners at an intermediate input rate until a blower on-delay is completed; running burners at a modulated input rate not to exceed a predetermined time limit once the blower on-delay is completed; and switching to a maximum input rate until the heating load is satisfied.

In accordance with yet another aspect of the disclosure, a method for providing multiple heating modes for a modulating furnace in a current cycle as a function of a previous cycle is disclosed. The method may include determining if a heating load needs to be satisfied; determining if a maximum input rate is required at start-up; if the maximum input rate is not required at start-up, running burners at an intermediate input rate for a first time interval until it exceeds a blower on-delay time; running burners at a modulated input rate for a second time interval that does not exceed a predetermined limit; running burners at the maximum input rate for a third time interval until the heating load is satisfied; calculating a heating load requirement as function of the first time interval, the second time interval, and the third time interval; and determining an initial input rate for a next cycle based on the calculated heating load requirement.

Other advantages and features will be apparent from the following detailed description when read in conjunction with the attached drawings.

For a more complete understanding of the disclosed system and method, reference should be made to the embodiments illustrated in greater detail in the accompanying drawings, wherein.

It should be understood that the drawings are not necessarily to scale and that the disclosed embodiments are sometimes illustrated diagrammatically and in partial views. In certain instances, details which are not necessary for an understanding of the disclosed methods and systems or which render other details difficult to perceive may have been omitted. It should be understood, of course, that this disclosure is not limited to the particular embodiments illustrated herein.

DETAILED DESCRIPTION OF THE DISCLOSURE

Figure 1:
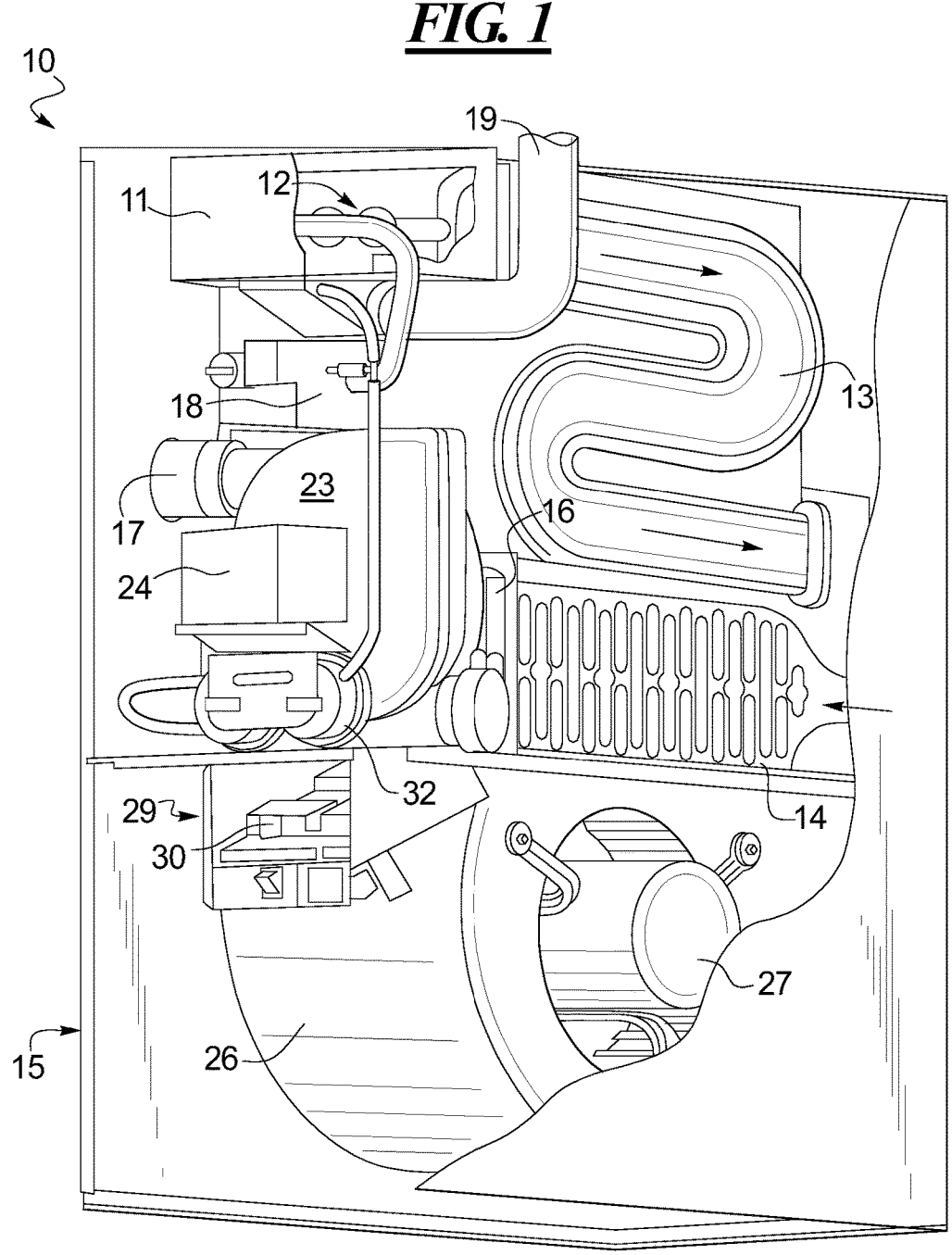
FIG. 1 is a perspective view of an embodiment of a furnace constructed in accordance with the teachings of the present disclosure.

Referring to FIG. 1, a gas-fired furnace which may be operated according to the principles of the present disclosure is illustrated. The following description may be made with reference to a condensing furnace 10, but it should be understood that the present disclosure contemplates incorporation with a non-condensing type furnace, cooling unit, heat pump, electric furnace, or any other type of heating or cooling source as well.

In FIG. 1, the condensing furnace 10 may include a cabinet 15, housing therein a burner assembly 11, a gas valve 18, a primary heat exchanger 13, a condensing heat exchanger 14, a draft induced blower 23 supporting an inducer motor 24, and a circulating air blower 26 supporting a drive motor 27. The burner assembly 11 may include a burner box 12, which may be in communication with the primary heat exchanger 13. Fluidly connected at the other end of the primary heat exchanger 13 may be the condensing heat exchanger 14 whose discharge end may be fluidly connected to a collector box 16 and an exhaust vent 17. In operation, the gas valve 18 may meter the flow of gas to the burner assembly 11 where combustion air from an air inlet 19 may be mixed and ignited by an igniter (not shown). The hot gas may be then passed through the primary heat exchanger 13 and the condensing heat exchanger 14, as shown by the arrows. The relatively cool exhaust gases may then pass through the collector box 16 through a condensate drain line from where it may be suitably drained to a sewer collection. Flow of combustion air into the air inlet 19 through the heat exchangers 13 and 14, and exhaust vent 17, may be enhanced by the draft induced blower 23 which may be driven by the motor 24 in response to control signals from a furnace control assembly 29 contained therein. Household air may be drawn into the blower 26 which may be driven by the drive motor 27 in response to signals received from the furnace control assembly 29.

Figure 2:
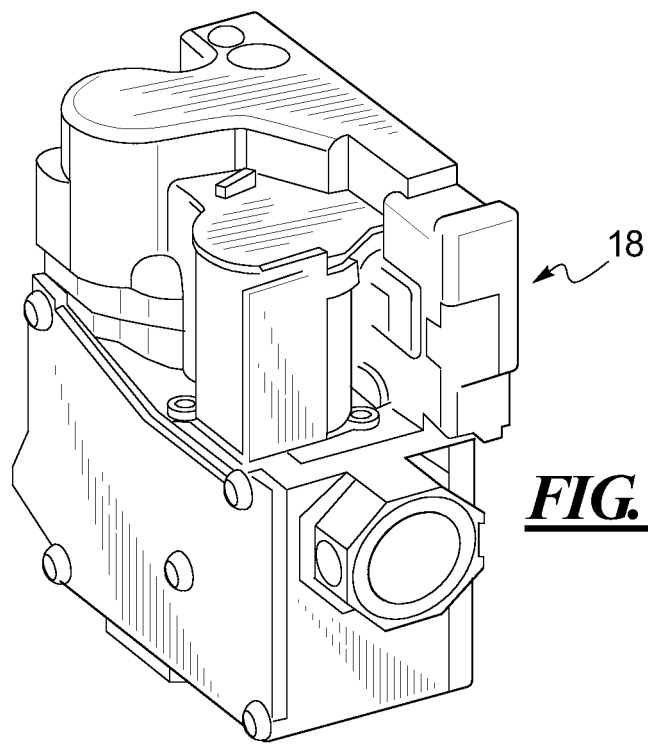
FIG. 2 is a perspective view of an embodiment of a gas valve constructed in accordance with the teachings of the present disclosure.

In one embodiment, the gas valve 18 may be a modulating gas valve as shown in FIG. 2 and may be fluidly connected to the burner box 12. The gas valve 18 may also be electrically connected to the furnace control assembly 29 in order to receive control signals to meter gas flow. Furthermore, it is to be understood that the gas valve 18 may not be limited to an electrically controlled gas valve, but may include any gas valve designed to be pneumatically controlled, such as, but not limited to, the gas valve disclosed in U.S. Pat. No. 5,860,411.

Figure 3:
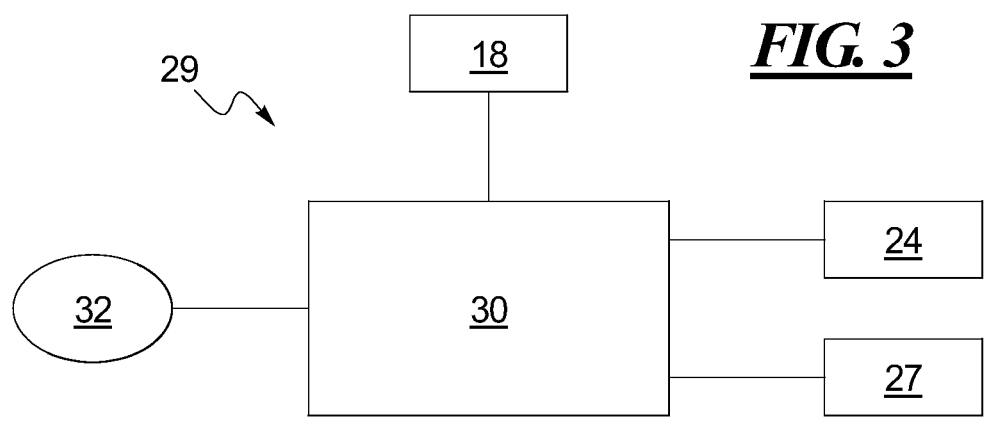
FIG. 3 is a block diagram of a portion of a furnace control system constructed in accordance with the teachings of the present disclosure.

Referring now to FIG. 3, a simplified block diagram showing the interconnection between a microprocessor control 30 and a thermostat 32, the gas valve 18, the inducer motor 24, and the drive motor 27 is illustrated. The microprocessor control 30 may be an adaptive microprocessor control containing a thermostat algorithm to control a modulating furnace described herein. It is to be understood, that the thermostat algorithm described herein may be used with modulating heating units, modulating cooling units, or any other type of modulating model.

Whenever a modulating model may be selected and the furnace may be operated from a conventional single-stage room thermostat, the furnace control assembly 29 may be adaptive by modifying the behavior of the system on the next heating cycle based upon the length of the previous cycle. The furnace control assembly 29 may cause the furnace to start-up at maximum input for reasons such as, but not limited to:

1. wire connections, electrically connecting thermostat to furnace, W/W1 and W2 inputs are ON;
2. thermostat algorithm determined that maximum input is required at start-up; and
3. fault condition that restricts operation to maximum input.

Otherwise, the furnace may always start-up at the intermediate input until the intermediate heat blower on-delay is complete. At the end of the blower on-delay, the furnace control assembly 29 may switch to a minimum input in the initial cycle, and then switch to a maximum input if the demand for heat remains unsatisfied through the whole duration of a cycle. On subsequent cycles the furnace may operate at the modulated input further defined in FIG. 4.

Figure 4:
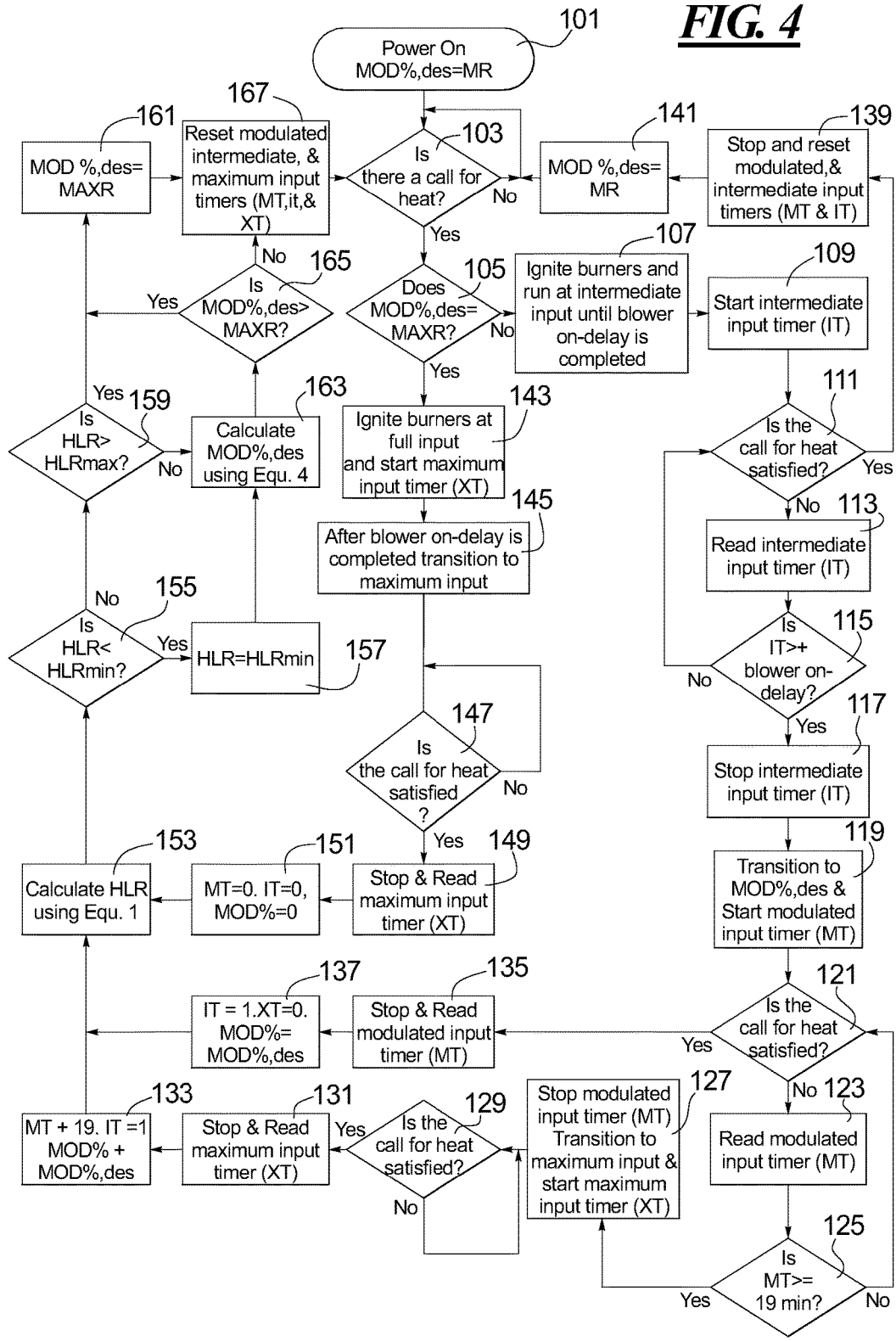
FIG. 4 is a flowchart depicting a sample sequence of steps which may be practiced in accordance with the method of the present disclosure.

Referring now to FIG. 4, a step 101 represents the powering on of the furnace whereupon the value of the calculated modulation input rate (MOD %,des), in the initial cycle, may be initialized to the minimum input rate (MR). A following step 103 represents the thermostat 32 sensing whether or not there is a heating load to be satisfied. If there is such a load, the single stage contact of the thermostat may be closed and a signal may be generated to the microprocessor control 30 indicating a need for heat. This test may be performed repeatedly until such time as a call for heat is generated. When a call for heat is recognized, the system proceeds to a step 105, where the microprocessor control 30 may determine whether or not MOD %,des may be equal to the maximum input rate (MAXR). If the furnace does not need to start-up at maximum input, i.e. MOD %,des does not equal MAXR, then in a step 107, burners within the burner box 12 may be ignited and the furnace may run at intermediate input until blower on-delay is completed.

The software may then initiate the running of the intermediate input timer (IT) at a step 109. Next, at a step 111, the thermostat 32 may be queried to determine whether or not the demand for heat is satisfied. If the demand for heat is not satisfied, then IT may be read at a step 113 and the software, at a step 115, may determine whether or not IT may be greater than or equal to the blower on-delay. If the value of IT does not exceed or equal the blower on-delay, then the control system may loop back to the step 111.

On the other hand, if IT is greater than or equal to the blower on-delay, then IT may be stopped at a step 117. At another step 119, a transition to MOD %,des may be made, which for the first cycle may be set to MR, and the modulated input timer (MT) may be started. In a following step 121, the thermostat 32 may be repeatedly queried to see whether or not the heat demand is satisfied. If the demand for heat is still not satisfied, then MT may be read at a step 123 and the software, at a step 125, may determine whether or not MT may be greater than or equal to a portion of the time of operation (T1), which in one exemplary embodiment may be nineteen minutes. If the value of MT does not exceed or equal T1, then the control system may loop back to the step 121.

On the other hand, if MT is greater than or equal to T1, then MT may be stopped, and a transition to maximum input may be made and the maximum input timer (XT) may be started at a step 127. In a following step 129, the thermostat 32 may be repeatedly queried to see whether or not the heat demand is satisfied, until such time that it is satisfied. Thereupon, at a step 131, XT may be stopped and read. At a step 133, the value of MT may be set to T1 and IT may be set to T2, another portion of the time of operation, such that in one exemplary embodiment, if T1 may be set to nineteen minutes and T2 may be set to one minute, then the total operation time (T) would equal twenty minutes. Also, the modulated input rate (MOD %) may be set to MR at the step 133. Calculations may then be performed at a step 153, as will be described hereinafter.

Returning now to the step 121 at which the thermostat 32 may be queried after transitioning to modulated input, if the heat demand is satisfied, then at a step 135, MT may be stopped and read. At a step 137, the value of XT may be reset to zero, and IT may be set to T2, which in one exemplary embodiment may be one minute. Also at the step 137, MOD % may be set to MR. Calculations may then be performed at the step 153, as will also be described hereinafter.

Returning now to the step 111 at which the thermostat 32 may be queried after starting IT, if the heat demand is satisfied, then at a step 139, MT and IT may be stopped and reset. At a step 141, MOD %,des may be reset to MR, and the system may return to the step 103, wherein it may cycle waiting for a call for heat from the thermostat 32.

Returning now to the step 105, if MOD %,des does equal MAXR, then at a step 143, the burners within the burner box 12 may be ignited at full input and XT may be started. After blower on-delay is completed, a transition to maximum input may be made at a step 145. In a following step 147, the thermostat 32 may be repeatedly queried to see whether or not the heat demand is satisfied, until such time that it is satisfied. Thereupon, at a step 149, XT may be stopped and read. At a step 151, MT, IT, and MOD % may be all reset to zero. Calculations as indicated at the step 153 may then be performed.

At the step 153, a heating load requirement (HLR) may be calculated to satisfy a call for heat as shown in the following equation:

$$HLR = (MOD\% \times MT) + (IR \times IT) + (MAXR \times XT) \quad \text{Equation 1}$$

Where:
MOD % may be the modulated input rate in percentage that the unit operated at during the previous cycle;
MR may be the minimum input rate in percentage;
IR may be the intermediate input rate in percentage;
MAXR may be the maximum input rate in percentage;
MT may be the modulated input time of operation in minutes during previous cycle;
IT may be the intermediate input time of operation in minutes during previous cycle; and
XT may be the maximum input time of operation in minutes during previous cycle.

A following step 155 may query whether the value HLR may be less than HLRmin In one exemplary embodiment, if one cycle consists of one minute of intermediate input and nineteen minutes of minimum input, then the value of HLRmin may be determined from the following equation:

$$HLRmin = (MR \times 19) + (IR \times 1). \quad \text{Equation 2}$$

If the minimum input rate may be 40% and the intermediate input rate may be 65%, in one exemplary embodiment, then HLRmin may be equal to 825, the maximum heating load requirement which may be satisfied at the minimum input. If HLR is less than 825, then at a step 157, HLR may be set equal to HLRmin and in a following step 163, MOD %,des may be calculated, as will be described below. If on the other hand, the step 155 determines that HLR is greater than HLRmin, then at a step 159, it may be determined whether the value of HLR may be greater than HLRmax. In one exemplary embodiment, if the total duration of operation time (T), i.e. one cycle, consists of 20 minutes of maximum input, then the value of HLRmax may be determined from the following equation:

$$HLRmax = (20 \times MAXR). \quad \text{Equation 3}$$

If the maximum input rate may be 100% in one exemplary embodiment, then HLRmax may be equal to 2000, the maximum load which may be satisfied at maximum input. If HLR is greater than 2000, then at a next step 161, MOD %,des may be set equal to MAXR. In a following step 167, the input timers (MT, IT, & XT) may be all reset, and the system may return to step 103 wherein it may cycle waiting for a call for heat from the thermostat 32. If on the other hand, HLR is not greater than 2000, then in step 163, MOD %,des may be calculated using the following equation:

$$MOD\%, des = (HLR - IR)/19. \quad \text{Equation 4}$$

The following step 165 may query whether the value MOD %,des may be greater than MAXR. If it is, then MOD %,des may be set equal to MAXR in a step 161. In the following step 167, the input timers (MT, IT, & XT) may be all reset, and the system may return to step 103 wherein it may cycle waiting for a call for heat from the thermostat 32. If MOD %,des is not greater than MAXR, then the input timers (MT, IT, & XT) may be all reset at the step 167, and the system may return to the step 103 wherein it may cycle waiting for a call for heat from the thermostat 32.

After the first cycle is completed, the furnace control may compute HLR using equation 1 and may compare the results to HLRmin and HLRmax. If HLR is less than HLRmin, the furnace control may let HLR equal HLRmin and may calculate MOD %,des using equation 4. If HLR is greater than HLRmin but less than HLRmax, the furnace control may calculate MOD %,des using equation 4 without adjusting HLR. If HLR is greater than HLRmax, the furnace control may set MOD %,des to the maximum input. The furnace may continue to run at maximum input until the call for heat is satisfied, upon which the thermostat contacts open, and the system may close the gas valve 18 within one second.

While only certain embodiments have been set forth, alternatives and modifications will be apparent from the above description to those skilled in the art. These and other alternatives are considered equivalents and within the spirit and scope of this disclosure and the appended claims.

What is claimed is:

1. A method for providing multiple heating modes for a modulating furnace, comprising the steps of:
   determining an existence of a heating load to be satisfied;
   determining if a maximum input rate is required at start-up;
   running burners at an intermediate input rate until a blower on-delay is completed, if the maximum input rate is not required at start-up;
   running burners at a modulated input rate not to exceed a predetermined time limit once the blower on-delay is completed; and
   switching to a maximum input rate until the heating load is satisfied.

2. The method of claim 1, further comprising the steps of:
   running burners at the maximum input rate until the heating load is satisfied, if the maximum input rate is required at start-up.

3. The method of claim 2, further comprising the steps of:
   resetting and restarting procedure once the heating load is satisfied.

4. The method of claim 1, further comprising the steps of:
   determining if the heating load is satisfied while the burners are operating in the intermediate input rate; and
   resetting and restarting procedure if the heating load is satisfied.

5. The method of claim 1, further comprising the steps of:
   determining if the heating load is satisfied while the burners are operating in the modulated input rate; and
   resetting and restarting procedure if the heating load is satisfied.

6. The method of claim 1, wherein determining the existence of the heating load to be satisfied is performed by a single-stage thermostat.

7. A method for providing multiple heating modes for a modulating furnace in a current cycle as a function of a previous cycle, comprising the steps of:
   determining an existence of a heating load to be satisfied;
   determining if a maximum input rate is required at start-up;
   running burners at an intermediate input rate for a first time interval until it exceeds a blower on-delay time, if the maximum input rate is not required at start-up;
   running burners at a modulated input rate for a second time interval that does not exceed a predetermined limit;
   running burners at the maximum input rate for a third time interval until the heating load is satisfied;
   calculating a heating load requirement as function of the first time interval, the second time interval, and the third time interval; and
   determining an initial input rate for a next cycle based on the calculated heating load requirement.

8. The method of claim 7, further comprising the steps of:
   determining if the heating load is satisfied while the burners are operating in the intermediate input rate; and
   resetting and restarting procedure if the heating load is satisfied.

9. The method of claim 7, further comprising the steps of:
   determining if the heating load is satisfied while the burners are operating in the modulated input rate;
   calculating the heating load requirement as function of the first time interval and the second time interval, if the heating load is satisfied; and
   determining the initial input rate for the next cycle based on the calculated heating load requirement.

10. The method of claim 7, further comprising the steps of:
    running burners at the maximum input rate for the third time interval until the heating load is satisfied, if the maximum input rate is required at start-up;
    calculating the heating load requirement as function of the third time interval; and
    determining the initial input rate for the next cycle based on the calculated heating load requirement.

11. The method of claim 7, wherein determining the existence of the heating load to be satisfied is performed by a single-stage thermostat.

12. A control system for a modulating furnace, the modulating furnace including at least one burner, comprising:
    a processor configured to execute at least one algorithm capable of providing multiple heating modes for the modulating furnace, the at least one algorithm including
    determining an existence of a signal indicating a heating load request;
    determining if a maximum input rate is required at start-up;
    if the maximum input rate is not required at start-up then (i) running the at least one burner at an intermediate input rate until a blower on-delay is completed; (ii) running the at least one burner at a modulated input rate not to exceed a predetermined time limit once the blower on-delay is completed; and (iii) if the predetermined time limit is exceeded and the heating load request not satisfied, running the at least one burner at a maximum input rate until the heating load request is satisfied;
    a gas valve electrically connected to the processor and capable of modulating gas flow to the at least one burner based on control signals received from the processor;
    at least one variable-speed motor electrically connected to the processor and capable of adjusting speed based on control signals received from the processor; and
    a thermostat electrically connected to the processor and capable of providing the signal indicating a heating load request to the processor.

13. The control system of claim 12, wherein the thermostat is a single-stage thermostat.

14. The control system of claim 12, wherein the variable-speed motor is at least one of an inducer motor and a blower motor.

15. The control system of claim 12, wherein the gas valve is a pneumatically controlled gas valve.

16. The control system of claim 12, wherein the at least one algorithm capable of providing multiple heating modes for the modulating furnace further includes running the at least one burner at the maximum input rate until the heating load is satisfied, if the maximum input rate is required at start-up.

17. The control system of claim 16, wherein the at least one algorithm capable of providing multiple heating modes for the modulating furnace further includes resetting and restarting procedure once the heating load is satisfied.

18. The control system of claim 12, wherein the at least one algorithm capable of providing multiple heating modes for the modulating furnace further includes:
    determining if the heating load is satisfied while the at least one burner is operating in the intermediate input rate; and resetting and restarting procedure if the heating load is satisfied.

19. The control system of claim 12, wherein the at least one algorithm capable of providing multiple heating modes for the modulating furnace further includes:
   determining if the heating load is satisfied while the at least one burner is operating in the modulated input rate; and
   resetting and restarting procedure if the heating load is satisfied.

* * * * *